(12) United States Patent
Zhou et al.

(10) Patent No.: US 10,599,688 B2
(45) Date of Patent: Mar. 24, 2020

(54) AUTOMATICALLY EMBEDDING DIGITAL MAPS IN SOFTWARE APPLICATIONS

(71) Applicant: GOOGLE LLC, Mountain View, CA (US)

(72) Inventors: Bailiang Zhou, Balgowlah (AU); Kenneth Richard Hoetmer, Sydney (AU)

(73) Assignee: GOOGLE LLC, Mountain View, CA (US)

( * ) Notice: Subject to any disclaimer, the term of this patent is extended or adjusted under 35 U.S.C. 154(b) by 395 days.

(21) Appl. No.: 15/509,812

(22) PCT Filed: Feb. 9, 2015

(86) PCT No.: PCT/US2015/014985
§ 371 (c)(1),
(2) Date: Mar. 8, 2017

(87) PCT Pub. No.: WO2015/120370
PCT Pub. Date: Aug. 13, 2015

(65) Prior Publication Data
US 2018/0232398 A1 Aug. 16, 2018

Related U.S. Application Data

(60) Provisional application No. 61/937,971, filed on Feb. 10, 2014.

(51) Int. Cl.
G06F 16/29 (2019.01)
G06F 16/903 (2019.01)
(Continued)

(52) U.S. Cl.
CPC .......... G06F 16/29 (2019.01); G06F 9/54 (2013.01); G06F 16/90344 (2019.01);
(Continued)

(58) Field of Classification Search
CPC combination set(s) only.
See application file for complete search history.

(56) References Cited

U.S. PATENT DOCUMENTS 7,085,629 B1 * 8/2006 Gotou ................. G01C 21/362
701/1
2003/0056175 A1 3/2003 Fujihara
(Continued)

FOREIGN PATENT DOCUMENTS

CN 101601025 A 12/2009

OTHER PUBLICATIONS

Examination Report for European Application No. 15706600.2, dated Oct. 17, 2017.
(Continued)

Primary Examiner — Thomas G Black
Assistant Examiner — Ana D Thomas
(74) Attorney, Agent, or Firm — Marshall, Gerstein & Borun LLP

(57) ABSTRACT

An application programming interface (API) for automatically providing digital maps to third-party software applications is provided. The API is configured to (i) receive a string of alphanumeric characters from a third-party software application that executes independently of a map service, (ii) automatically determine whether the string is consistent with one or more indications of geographic locations, (iii) when the string is consistent with an indication of a geographic location, determine whether a digital map of a geographic area including the indicated geographic location should be generated, and (iv) in response to determining that the digital map should be generated, receive the digital from the map service and provide the digital map to the third-party software application for display via a user interface.

20 Claims, 6 Drawing Sheets

(51) Int. Cl.
*G09B 29/00* (2006.01)
*G09B 29/10* (2006.01)
*G06F 9/54* (2006.01)
*H04L 12/58* (2006.01)

(52) U.S. Cl.
CPC ......... *G09B 29/003* (2013.01); *G09B 29/106* (2013.01); *H04L 51/08* (2013.01)

(56) References Cited

U.S. PATENT DOCUMENTS

| | | | |
|---|---|---|---|
| 2008/0171555 A1 | 7/2008 | Oh et al. | |
| 2011/0197200 A1* | 8/2011 | Huang | H04W 4/021 |
| | | | 719/313 |
| 2013/0111354 A1 | 5/2013 | Marra et al. | |
| 2013/0325318 A1 | 12/2013 | Piemonte | |

OTHER PUBLICATIONS

International Search Report and Written Opinion for Application No. PCT/US2015/014985, dated May 28, 2015.
International Preliminary Search on Patentability for Application No. PCT/US2015/014985, dated Aug. 16, 2016.
First Office Action for Chinese Application No. 201580013067.1, dated Mar. 15, 2019.
Second Office Action for Chinese Application No. 201580013067.1, dated Aug. 14, 2019.

* cited by examiner

AUTOMATICALLY EMBEDDING DIGITAL MAPS IN SOFTWARE APPLICATIONS

FIELD OF TECHNOLOGY

This application generally relates to interactive digital maps and, more particularly, to automatically embedding digital maps in electronic documents that reference geographic locations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Numerous software applications allow users to type in, dictate, or otherwise input text that references geographic locations. For example, a user of an instant messaging (or "chat") application can type in a message telling her friends where to meet. If the user wishes to insert a digital map of the location for additional clarity, she can launch a mapping application or access an online map service, capture the screen or the window, and insert the image into the message. These operations take up a significant amount of time, which is particularly inconvenient when users try to communicate instantly.

SUMMARY

Using the techniques of this disclosure, a software application that supports interactions with an electronic document can automatically embed a digital map in the electronic document without requiring that the user explicitly import the digital map from a mapping application, a web browser, or another application. Examples of such software modules include mailing applications, instance messaging (e.g., "chat") applications, social networking applications, web browsers via which users can edit electronic documents, etc. The software application provides user input to a geographic reference detection module which determines whether the input includes patterns consistent with names of geographic locations, street addresses, terms referring to locations such as "here," "home," "my office," etc., or other references to places, and provides an corresponding indication to the software application. If the software module indicates that the user confirmed a selection of a digital map, the geographic reference detection module provides the digital map to the software module in an image format or an interactive vector format, for example. At least in some of the embodiments, the application is developed separately and independently of the geographic reference detection module and/or the platform of the device on which the application executes, and accordingly operates as a third-party software application.

More particularly, an example embodiment of these techniques is a non-transitory computer-readable medium storing thereon instructions that implement an application programming interface (API) for automatically providing digital maps to third-party software applications. The API is configured to (i) receive a string of alphanumeric characters from a third-party software application that executes independently of a map service, (ii) automatically determine whether the string is consistent with one or more indications of geographic locations, (iii) when the string is consistent with an indication of a geographic location, determine whether a digital map of a geographic area including the indicated geographic location should be generated, and (iv) in response to determining that the digital map should be generated, receive the digital from the map service and provide the digital map to the third-party software application for display via a user interface.

Another embodiment of these techniques is a computing device including one or more processors, a user interface, and a non-transitory computer-readable medium storing thereon instructions that implement a geographic reference detection module configured to generate digital maps using a map service. The geographic reference detection module executes on the one or more processors to (i) receive a string of alphanumeric characters from a third-party software application executing on the one or more processors, (ii) automatically determine whether the string is consistent with indications of geographic locations, (iii) when the string is determined to be consistent with an indication of a geographic location, obtain a digital map of a geographic area including the indicated geographic location from the map service, and (iv) provide the digital map to the third-party software application for display via the user interface.

Yet another embodiment of these techniques is a method in a user computing device for incorporating digital map into electronic documents. The method includes receiving, from a software application that receives input from a user via a user interface, a string of alphanumeric characters submitted by the user. The method further includes automatically determining whether the string is consistent with one or more indications of geographic locations and, in response to determining that the string is consistent with an indication of a geographic location, (i) providing a notification to the third-party software application that a potential indication of a geographic location has been detected in the string, (ii) receiving a request from the third-party software application for a digital map of the indicated geographic location, and (iii) in response to the request from the third-party software application, providing the digital map of the indicated geographic location to the third-party software application.

DETAILED DESCRIPTION

Figure 1:
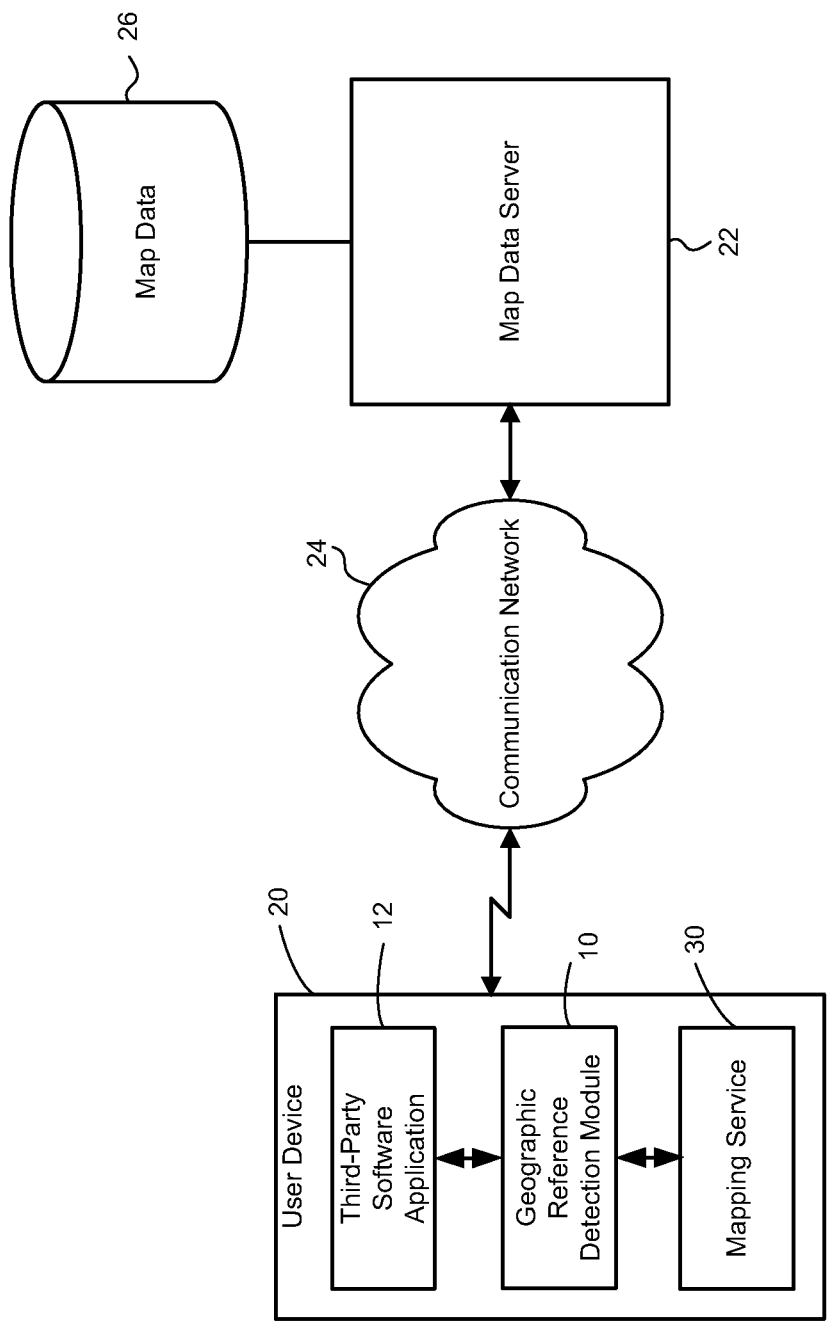
FIG. 1 is a block diagram of an example system in which the techniques for automatically embedding digital maps in software applications can be implemented.

Referring to FIG. 1, a geographic reference detection module ("geographic module") 10 allows software applications, such as third-party software application 12, to automatically embed a digital map in an electronic document such as an email message, an instant message, a post on a social networking website, a text document, etc. In an example implementation, the third-party software application 12 forwards user input to geographic module 10 as the user types in or speaks individual letters, words, or phrases. The geographic module 10 parses the received user input to determine whether the user has likely referenced a geographic location. As a more specific example, the geographic module 10 can determine that a certain portion of user input is consistent with a street address (e.g., "233 South Wacker"), a geographic landmark (e.g., "the Statue of Liberty"), the name of a city (e.g., "Denver"), etc. If the geographic module 10 recognizes a pattern that may be a geographic location, the geographic module 10 provides a corresponding notification the software application 12, which in response can generate a user prompt to ascertain whether the user wishes to embed a digital map in the electronic document. If the user accepts the prompt, the geographic module 10 generates a digital map and provides the digital map to the third-party software application 12.

In the example implementation of FIG. 1, the geographic module 10 and the third-party software application 12 operate in a user device 20, which can be a desktop computer, a laptop computer, a tablet computer, a smartphone, etc. The user device 20 can obtain map data from a map data server 22 via a communication network 24, which can be a personal area network, a local area network, or a wide area network such as the Internet. The map data server 22 in turn can obtain map data from a map database 26. In general, the map database 26 can store map data in a vector format, a raster format, and/or any other suitable scalable or non-scalable format.

The geographic module 10 can be native to the user device 20 (e.g., provided as part of the software platform of the user device 20) or developed independently of the software platform of the user device 20. Further, the geographic module 10 in general can co-operate with any application executing on the user device 20, including applications that are native to the platform of the user device 20 and applications that are provided by third parties, which can have no direct access to mapping, navigation, and other functions of the map data server 22. Although the examples of this disclosure focus primarily on interactions with such third-party software applications, in general these techniques need not be limited to these applications.

In an example embodiment, the geographic module 10 is a set of instructions that implement an application programming interface (API) for accessing a mapping service 30. The third-party software application 12 does not have access to the mapping service 30 other than through the geographic module 10. These software applications can invoke one or several functions "exposed" by the mapping service 30 via the geographic module, in accordance with a certain definition of one or several classes, methods, data structures, constants, function prototypes, etc. The interface provided by the geographic module 10 can specify the format of requests which the third-party software application 12 can submit to the mapping service 30 as well as the format of responses from the mapping service 30.

As a more specific example, the geographic module 10 in an example embodiment exposes an API that can be invoked by JavaScript code. The API can include a function, a method, etc. which the third-party software application 12 invokes to specify an alphanumeric string. Additionally or alternatively, the API can include a function, a method, etc. to supply partial user input which can be initial (e.g., the first character the user typed in) or intermediate (a new character the user just added at the end of a string). In the latter case, the API can add the partial intermediate user input to the previously input to determine whether the newly formed string is consistent with indications of geographic locations. The call to the API can be synchronous or asynchronous.

Figure 2:
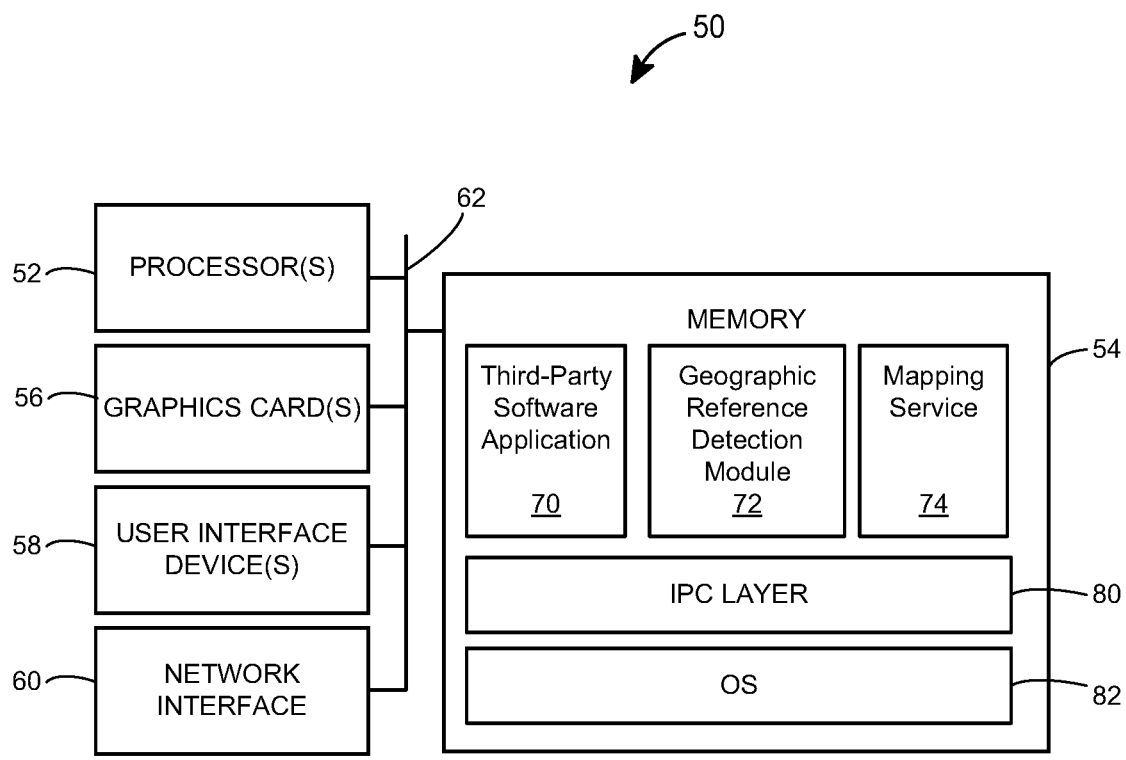
FIG. 2 is a block diagram of an example client device that implements a geographic reference detection module to automatically generate a digital map for a third-party application, which can operate in the system of FIG. 1.

FIG. 2 is a block diagram of an example device 50, which can operate in the system of FIG. 1 as the user device 20, for example. The device 50 includes one or more processor(s) 50, which can be, for example, general-purpose processor(s) provided on a central processing unit (CPU). The device 50 further includes a memory 54 which can include persistent memory components (e.g., a flash drive, a hard disk) and/or non-persistent memory components (e.g., a random access memory (RAM) module). Further, the device 50 includes a graphics card 56 configured to support a graphic pipeline of any suitable type, one or more user interface (UI) devices 58 such as a touchscreen, a keyboard, a mouse, etc., and a network interface 60 configured to support communications via a short-range and/or long-range communication links. The components 52-60 are interconnected via a digital bus 62, in this example implementation.

In an embodiment, the memory 54 stores a third-party software application 70, a geographic module 72, and a mapping service module 74. The software components 70, 72, and 74 can communicate using an inter-process communication (IPC) layer 80, which may be a messaging mechanism provided by the operating (OS) 82, for example. More generally, the software components 70, 72, and 74 can exchange data and calls using any suitable software technique.

In an example implementation, each of the software components 70, 72, and 74 executes as a separate process or a component of a separate respective task such as a process, service, daemon, etc. In another example implementation, the third-party software application 70 invokes the geographic module 72 as a library or otherwise as a component linked to the third-party software application 70, so that the software components 70 and 72 execute as part of a same process and/or same thread. Similarly, the mapping service 74 can be provided as a library rather than a separate task. The components 70, 72 and 74 thus can be combined or further subdivided, depending on the implementation.

Figure 3:
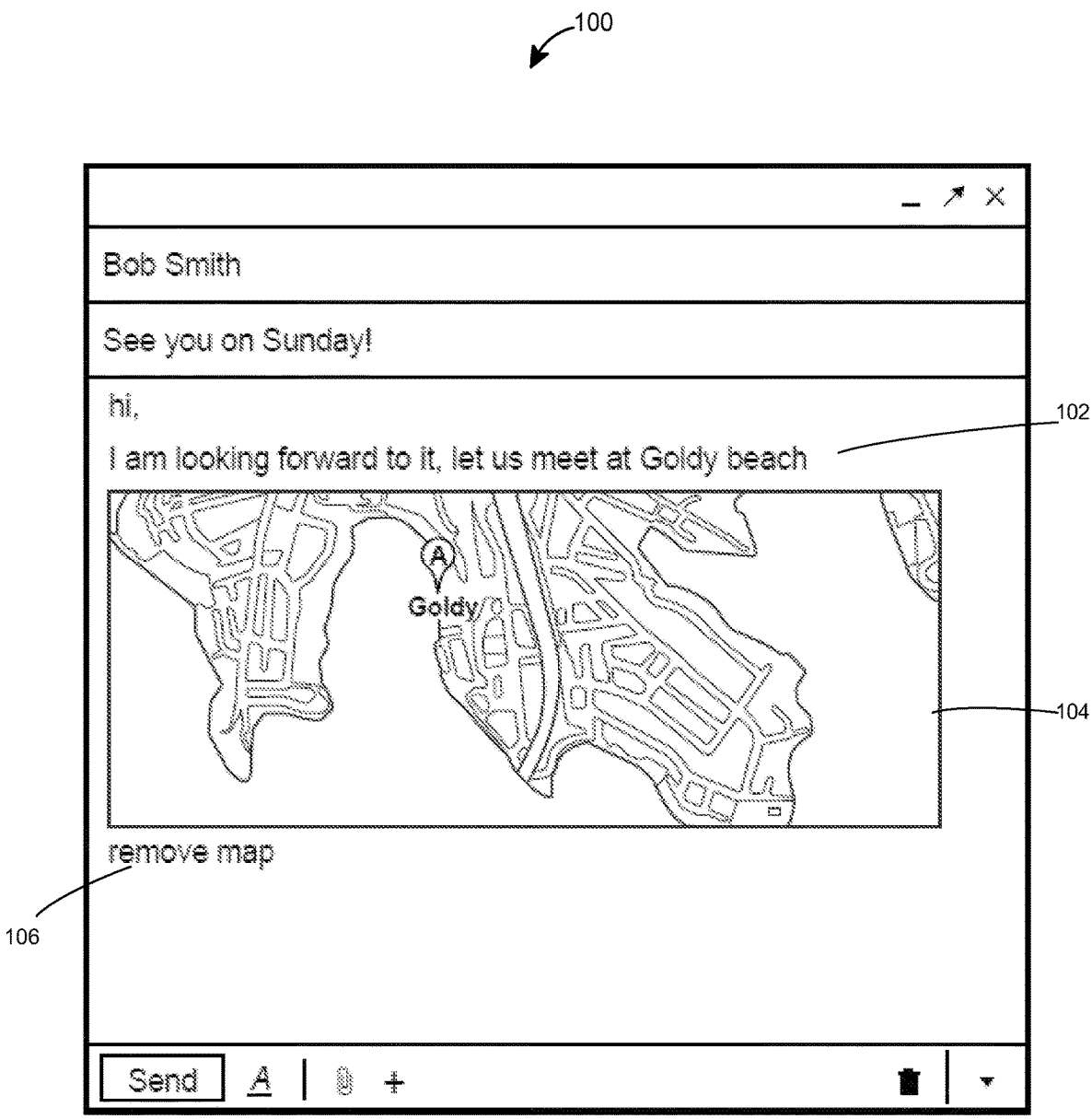
FIG. 3 is an example screen of a mailing software that invokes a mapping software component to automatically embed a digital map in a message.
Figure 4:
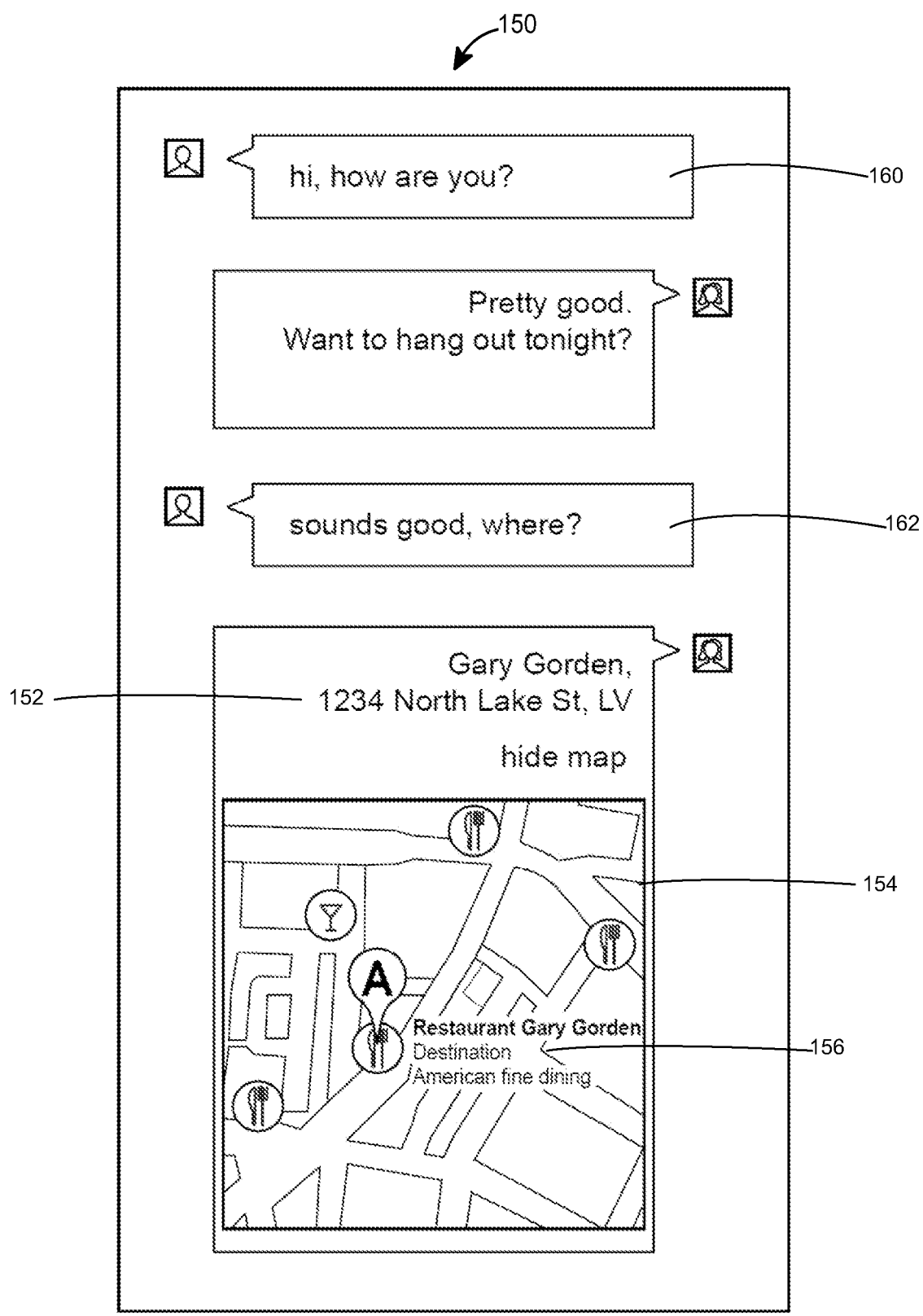
FIG. 4 is an example screen of an instant messaging software that invokes a mapping software component to automatically embed a digital map in an instant message.

For additional clarity, FIGS. 3 and 4 illustrate example screens of a mailing software and a messaging software, respectively, that automatically embeds a digital map in accordance with the techniques of this disclosure. In some embodiments, the screens of FIGS. 3 and 4 are generated by the same software in different scenarios or modes of operation. For example, these screens can be generated by the third-party software application 12 or 70.

Referring first to FIG. 3, a screen 100 illustrates an example window of a mailing application in which a user types in an email message. The mailing application can operate on a computing device as a third-party software application, similar to the software application 12 or 70. Once the user's message mentions a geographic location (in this case, "Goldy beach"), the mailing application automatically embeds a digital map depicting this location in the email message. In some embodiments, the digital map includes a geographic marker at the location mentioned in the user's message.

More specifically, in one embodiment, a geographic module, such as the geographic module 10 or 72 mentioned above, automatically detects the pattern 102 within the user's text input. The geographic module may provide an indication to the mailing software that a potential geographic reference has been detected in the user's input and, in response to a confirmation, generate a digital map image. If desired, the geographic module can receive additional parameters as part of the confirmation, such as the zoom level, the size of the map, etc. To this end, the geographic module may request that the mailing software generate a dialogue screen.

As one alternative, the user may configure the mailing application to allow the geographic module to generate the digital map image 104 and insert it at a new line after the current location of the text cursor, without awaiting further confirmation from the user. The user also may configure additional parameters such as the format of the image, the size of the image, the position of the image, etc.

In either case, the mailing software can provide a control 106 for removing the automatically generated digital map. If desired, the mailing software also can provide a control for disabling future suggestions to embed a digital map.

The digital map image 104 can conform to a standard format such as PNG or JPEG, for example. In some implementations, however, the digital map image 104 can be an interactive digital image which the user pan, zoom into, etc. The mailing software in this implementation can allocate a certain portion of the window to the geographic module, which then can render interactive map content within the allocated portion.

FIG. 4 illustrates a screen 150 illustrates an example window of a messaging application in which a user types in messages and instantly sees responses from another user. Similar to the example above, when the user types in a potential reference 152 to a geographic location, the messaging application can be a third-party software application that automatically receive a digital map from a geographic module such as the geographic module 10 or 72 discussed above. The messaging application then can embed a digital map image 154 of the mentioned location in the message. In this example, the user types in a string that has a format consistent with a geographic location, "1234 North Lake St."

In an implementation, the geographic module automatically obtains business information, directions, reviews, etc. related to the geographic location mentioned in the user's message in addition to a digital map image of the location. In the example of FIG. 4, the geographic module obtains a brief description of the business located at the address detected in the reference 152.

In some implementations, the messaging application can detect potential references to geographic locations in the other party's responses in addition to, or instead of, the messages from the user of the messaging application. For example, if the other party's instant message 160 or 162 includes a reference to a geographic location, the geographic module can automatically embed a digital map image corresponding to the referenced location, or suggest that such an image be embedded. Similarly, referring back to FIG. 3, digital map images can be embedded for locations referenced in incoming messages as well as outgoing messages. In this manner, large units of data need not be transmitted over a communication network, and messaging, particularly instant messaging, can remain "light-weight."

Referring generally to FIGS. 3 and 4, the user can edit and view electronic documents that include geographic references without having to launch a mapping application, copy a map, paste the map into the document, etc. Thus, the user can create documents that embed digital maps faster and fewer distractions. Further, in some implementations, when the user reviews an incoming message or another electronic document that references a geographic location, she need not use another application to view a map of that location.

Figure 5:
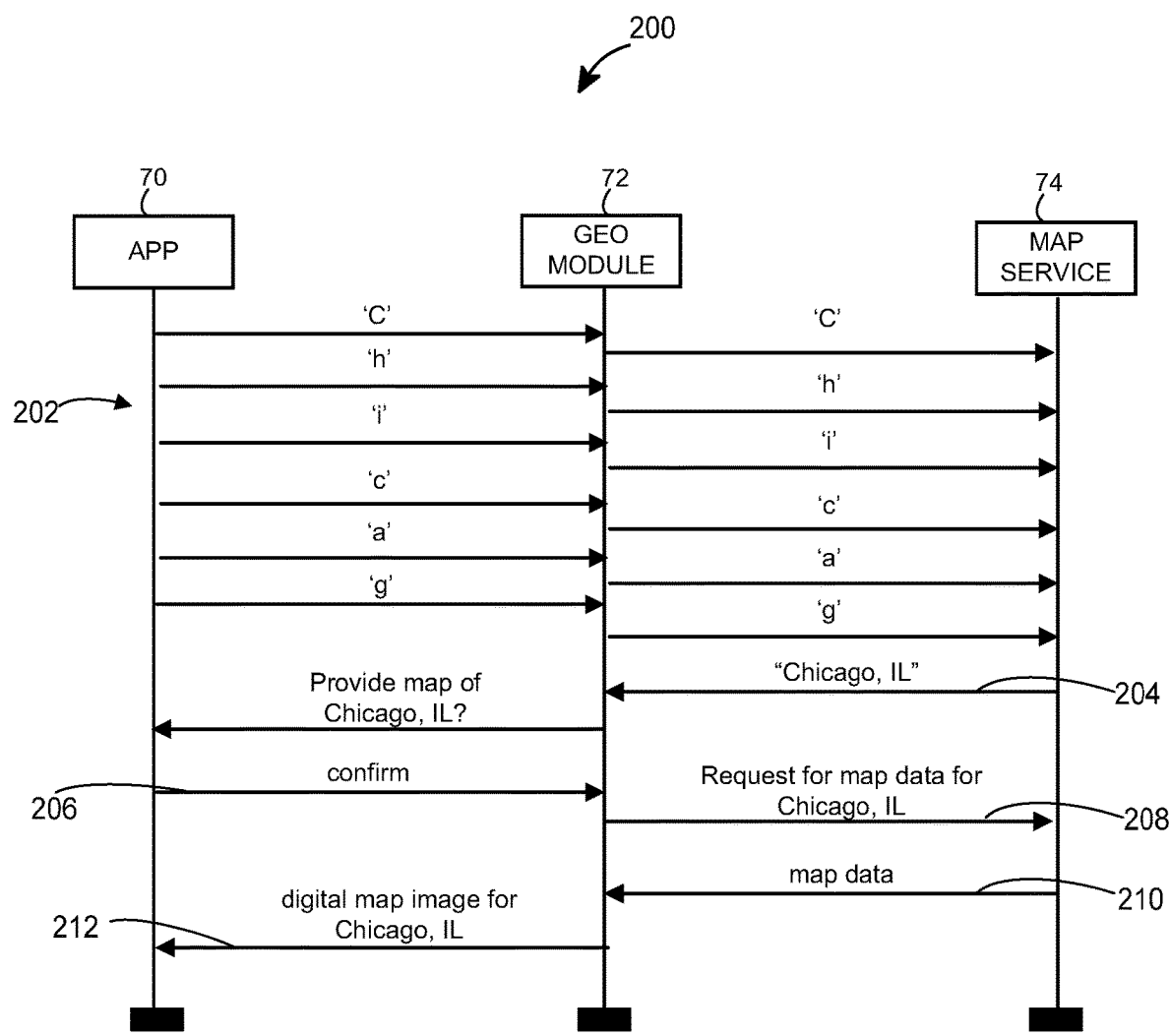
FIG. 5 is message sequence diagram for an example embedding a digital map in a software application.

Next, FIG. 5 illustrates a message sequence diagram 200 for an example message exchange between the third-party software application 70, the geographic module 72, and the mapping service module 74. In this example scenario, the software application 70 reports alphanumeric characters to the geographic module 72 as the user types in these characters. In particular, the software application 70 separately notifies the geographic module 72 of each of the letters 'C', 'h', 'i', 'c', 'a,' and 'g' via a sequence of messages 202. As discussed above, the software application 70 in other implementations reports alphanumeric strings to the geographic module 72 only after the user completes the input by transitioning to a new line, entering a punctuation mark, etc.

The geographic module 72 forwards the messages 202 to the mapping service module 74. The mapping service 74 determines, based on the partial input "Chicag," that the user is likely referring to "Chicago, Ill." To determine this potential match, the mapping service 74 may contact a map data server (e.g., the map data server 22 of FIG. 1) or a suggestions server via a communication network. The mapping service 74 then provides a suggestion 204 to the geographic module 72, which in turn provides the suggestion to the third-party software application 70. If the third-party software application 70 confirms the selection by providing a dialogue for the user and receiving a positive response, for example, the third-party software application 70 provides the corresponding notification 206 to the geographic module 72.

In some scenarios, the suggestion 204 may reference multiple geographic locations. The user in this case can select the desired location and specify the selection via the confirmation notification 206.

In the scenario of FIG. 5, the third-party software application 70 requests map data for generating a digital map of the suggested location (message 208), and the mapping service 74 provides the requested map data to the geographic module 72. Depending on the implementation, the map data can include raster images, vector data, etc. The geographic module 72 then generates a digital map image based on the received map data and provides the map image to the third-party software application 70.

Figure 6:
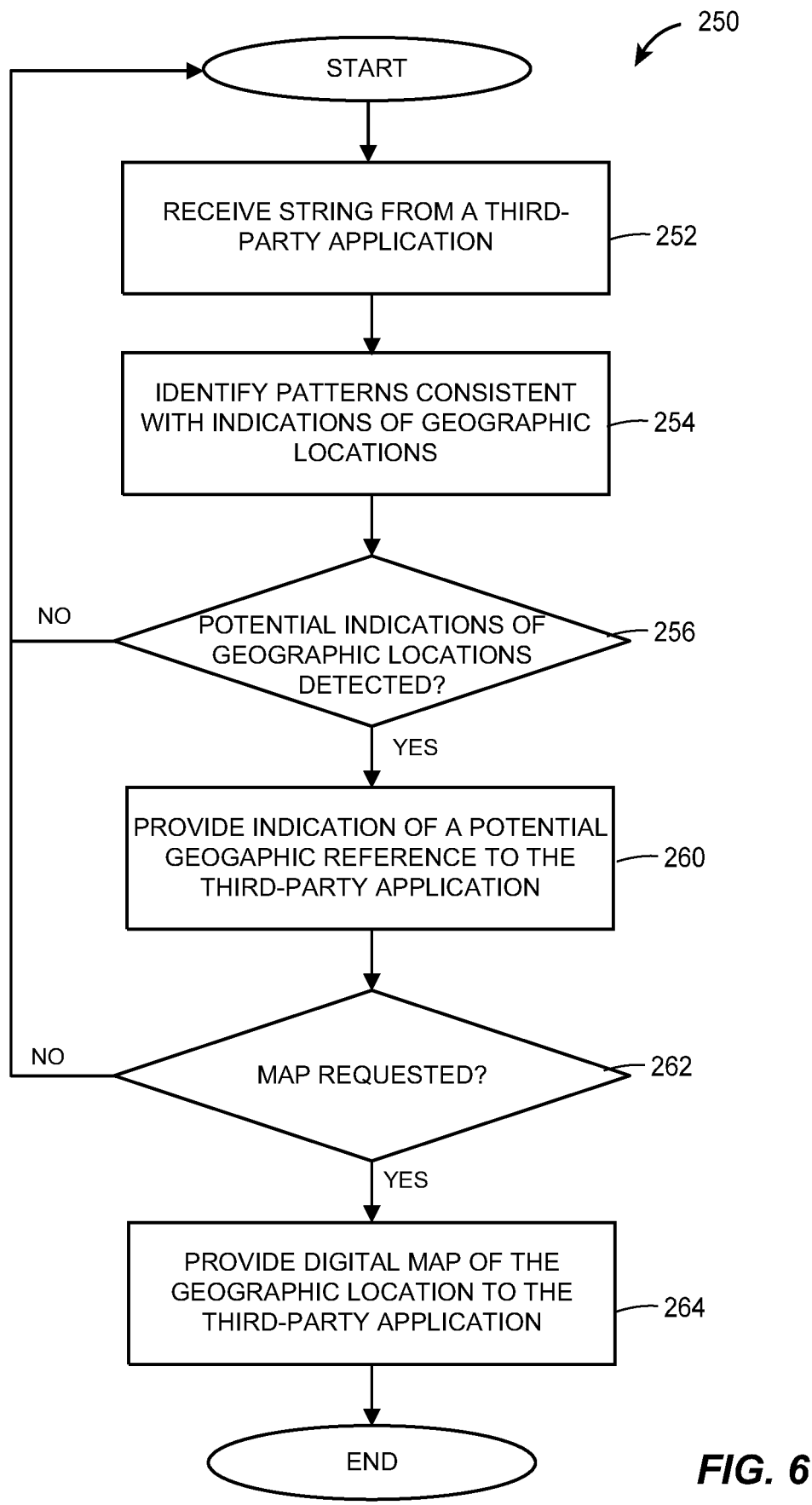
FIG. 6 is a flow diagram of an example method for automatically generating a digital map for insertion into an electronic document.

Next, FIG. 6 illustrates an example method 250 for automatically generating a digital map for insertion into an electronic document, which can be implemented in the user device 20 of FIG. 1 or the device 50 of FIG. 2, for example. As a more specific example, the method 250 can be implemented at least partially in the geographic reference detection module 10 or 72, as a set of instructions stored on a computer-readable memory and executable on one or more processors.

The method 250 begins at block 252, when a string describing user input is received at block 252. The input can be received from a third-party software application or, more generally, from any software application which the user operates to create an electronic document. The received input can correspond to partial input or completed input, depending on the implementation. The method then proceed to block 254, where one or several patterns consistent with geographic locations are identified. A pattern can correspond, for example, to the name of a landmark, a street address, an intersection of two streets (e.g., "corner of X and Y," where X and Y are capitalized). Further, a pattern can include one or more terms that refer a location without directly identifying the location, such as "here," "home,"

"my office," etc. In some of these cases, the module or system that implements the method 250 can determine the correspondence of the term(s) to a geographic location based on the user profile. For example, the term "home" for a certain user can be automatically resolved to "123 Main St."

At block 256, the method 250 determines whether one or more such patterns have been identified. If no patterns have been identified, the flow returns to block 252 to receive new user input or additional user input. Otherwise, if one or more patterns have been identified, the flow proceeds to block 260.

One or several indications of potential geographic locations are provided to the third-party application at block 260. At block 262, the method 250 determines whether the third-party application requests an instance of a digital map for the identified location. If no confirmation is received, the flow returns to block 252. Otherwise, a digital map is obtained is provided to the third-party application at block 264.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a navigation API through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing thereon instructions that implement an application programming interface (API) for automatically providing digital maps to third-party software applications, wherein the API is configured to:
   receive a string of alphanumeric characters from a third-party software application that executes independently of a map service;
   automatically determine whether the string is consistent with one or more indications of geographic locations;
   in response to determining that the string is consistent with an indication of a geographic location:
      provide a notification to the third-party software application that a potential indication of a geographic location has been detected in the string,
      receive a request from the third-party software application for a digital map of the indicated geographic location, and
      in response to the request, receive the digital map from the map service and provide the digital map to the third-party software application for display via a user interface.

2. The non-transitory computer-readable medium of claim 1, wherein the API is configured to:
   in response to determining that the received string is consistent with multiple indications of respective multiple geographic locations, include in the notification references to the multiple geographic locations, and
   receive a selection of one of the multiple geographic locations from the third-party software application.

3. The non-transitory computer-readable medium of claim 1, wherein to determine whether the string is consistent with indications of geographic locations, the API is configured to determine whether the string includes (i) a street address, (ii) a name of a landmark location, (iii) a name of a city.

4. The non-transitory computer-readable medium of claim 1, wherein the API is further configured to provide the digital map in a standard digital image file format.

5. The non-transitory computer-readable medium of claim 1, wherein the API is further configured to provide the digital map in an interactive format for embedding in a digital document controlled by the third-party software application.

6. The non-transitory computer-readable medium of claim 1, wherein the map service executes on a network server, and wherein to determine whether the string is consistent with indications of geographic locations, the API is configured to:

transmit the string to the network server via a communication network, and receive, from the network server, a notification of whether the string includes is consistent with the indication of a geographic location.

7. The non-transitory computer-readable medium of claim 6, wherein the string includes incomplete user input, and wherein the API is configured to receive, from the server, one or more suggestions of geographic locations.

8. The non-transitory computer-readable medium of claim 1, wherein to receive the string of alphanumeric characters, the API is configured to separately receive each of the alphanumeric characters via a sequence of messages.

9. A computing device comprising:
one or more processors;
a user interface; and
a non-transitory computer-readable medium storing thereon instructions that implement a mapping module configured to generate digital maps using a map service, wherein the mapping module executes on the one or more processors to:
receive a string of alphanumeric characters from a third-party software application executing on the one or more processors,
automatically determine whether the string is consistent with indications of geographic locations,
when the string is determined to be consistent with an indication of a geographic location, (i) provide a notification to the third-party software application that a potential indication of a geographic location has been detected in the string, (ii) receive a request from the third-party software application for a digital map of the indicated geographic location, (iii) obtain a digital map of a geographic area including the indicated geographic location from the map service, and (iv) provide the digital map to the third-party software application for display via the user interface.

10. The computing device of claim 9, wherein the third-party software application invokes the mapping module as an application programming interface (API), and wherein the map service executes on the one or more processors as a separate task independent of the third-party software application.

11. The computing device of claim 9, wherein non-transitory computer-readable medium further stores instructions that implement the third-party software application, wherein the third-party software application provides a messaging service.

12. The computing device of claim 9, wherein to determine whether the string is consistent with indications of geographic locations, the mapping module is configured to determine whether the string includes (i) a street address, (ii) a name of a landmark location, (iii) a name of a city.

13. The computing device of claim 9, wherein the mapping module is further configured to provide the digital map in a standard digital image file format.

14. The computing device of claim 9, wherein the mapping module is further configured to provide the digital map in an interactive format for embedding in a digital document controlled by the third-party software application.

15. The computing device of claim 9, wherein to receive the string of alphanumeric characters, the mapping module is configured to separately receive each of the alphanumeric characters via a sequence of messages.

16. A method in a user computing device for incorporating digital map into electronic documents, the method comprising:
receiving, from a software application that receives input from a user via a user interface, a string of alphanumeric characters submitted by the user;
automatically determining whether the string is consistent with one or more indications of geographic locations;
in response to determining that the string is consistent with an indication of a geographic location, (i) providing a notification to the third-party software application that a potential indication of a geographic location has been detected in the string, (ii) receiving a request from the third-party software application for a digital map of the indicated geographic location, and (iii) in response to the request from the third-party software application, providing the digital map of the indicated geographic location to the third-party software application.

17. The method of claim 16, further comprising:
providing a notification to the third-party software application that a potential indication of a geographic location has been detected in the string, and
receiving the request for the digital map in response to the provided notification, receive a confirmation from the third-party software application that the digital map including the indicated geographic location should be generated.

18. The method of claim 16, further comprising:
in response to determining that the received string is consistent with multiple indications of respective multiple geographic locations, including in the notification references to the multiple geographic locations, and
receiving a selection of one of the multiple geographic locations from the third-party software application.

19. The method of claim 16, wherein providing the digital map of the indicated geographic location to the third-party software application includes generating the digital map in a standard digital image file format.

20. The method of claim 16, wherein providing the digital map of the indicated geographic location to the third-party software application includes providing the digital map in an interactive format for embedding in a digital document controlled by the third-party software application.

* * * * *